Jan. 6, 1970  H. C. HERP, JR  3,488,161
AMMONIA CONVERTER
Filed May 11, 1964  2 Sheets-Sheet 1

INVENTOR.
HENRY C. HERP JR,
BY Jungblut, Melville,
Strasser & Foster
ATTORNEYS

Jan. 6, 1970   H. C. HERP, JR   3,488,161
AMMONIA CONVERTER

Filed May 11, 1964   2 Sheets-Sheet 2

INVENTOR.
HENRY C. HERP JR,
BY *Jungblut, Melville,*
*Strasser & Foster*

ATTORNEYS 3,488,161
AMMONIA CONVERTER
Henry C. Herp, Jr., Louisville, Ky., assignor to Girdler Corporation, Louisville, Ky., a corporation of Ohio
Filed May 11, 1964, Ser. No. 366,314
Int. Cl. B01j 9/00
U.S. Cl. 23—289                              11 Claims

ABSTRACT OF THE DISCLOSURE

A catalytic converter with an inner sleeve joined to the top closure, and a catalyst basket supported within the sleeve. The closures are hemispherical and thinner than the casing, and welded thereto, permitting ease of cutting and rewelding.

---

The invention relates to an ammonia converter, and more particularly to a form of ammonia converter which may be connected in parallel to a plurality of similar converters, whereby a range of capacities may be achieved.

In the usual process for the manufacture of ammonia, ammonia synthesis gas containing hydrogen and nitrogen in the desired proportions, is compressed to approximately 5000 p.s.i.g. The compressed synthesis gas is combined with a recycle stream in a ratio of about 4 parts of recycle gas to 1 part synthesis gas. The combined gas stream is filtered to remove compressor oil and the like, cooled by heat exchange, and further cooled by refrigeration so as to condense ammonia in the gas stream. The liquid ammonia is separated from the gas stream in a secondary ammonia separator and transferred to a flash drum. The gas steam is reheated by heat exchange and caused to pass into an ammonia converter. Within the converter a reaction takes place which may be represented as follows:

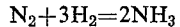

$$N_2 + 3H_2 = 2NH_3$$

In its usual form, an ammonia converter comprises an elongated, vertically oriented pressure vessel containing (from top to bottom) a heater, a catalyst basket, and a heat exchanger. Synthesis gas is introduced into the pressure vessel near its top and caused to travel downwardly between the inside surface of the vessel and the outside surfaces of the housings of the elements mentioned above. Thus, the incoming synthesis gas is used to cool the walls of the pressure vessel. Near the bottom of the vessel, the gas is introduced into the lower portion of the heat exchanger where it is caused to pass about a plurality of tubes carrying the downwardly flowing product gas. The synthesis gas is then caused to flow upwardly through a complex baffle assembly located between the heat exchanger and the catalyst basket. The baffle assembly directs the synthesis gas upwardly through the catalyst cooling tubes which extend through the catalyst basket. The catalyst cooling tubes lead to a passage which in turn conducts the synthesis gas to the upper portion of the start-up heater means. At this point, the synthesis gas begins to flow through the heating element into the catalyst basket. Within the catalyst basket, an exothermic reaction between the hydrogen and the nitrogen takes place in accordance with the formula above to form ammonia. A conversion of approximately 20% is obtained. The hot converted gas is then caused to enter other portions of the above mentioned baffle assembly by which it is led to a plurality of heat exchanger tubes extending the length of the heat exchanger. At this point, the converted gas is collected and passes out of the converter through an outlet at its bottom. The converted gas is then cooled, and then caused to enter an ammonia separator. The gas recovered in the separator may be recycled as mentioned above.

Ammonia converters of the type described are large, complex structures. The pressure vessel is necessarily thick-walled and often provided with expensive high-pressure flanged closures which occasionally give trouble due to leakage. Such converters require heavy type fabrication, are difficult to ship, and require a great deal of time and expense to manufacture. Furthermore, such converters often require individual designing to meet the production requirements of the particular installation of which they are to be a part.

It is therefore a primary object of the present invention to provide an ammonia converter, of a given capacity, which is adapted to be connected in parallel to a plurality of similar converters whereby a range of capacities may be achieved.

It is an object of the present invention to provide an ammonia converter characterized by greatly simplified fabrication. The converter of the present invention is comprised of a number of standard sections made up of pipe, castings, pressed heads, tubes and thin plates, obviating the necessity of heavy type fabrication.

It is an object of the present invention to provide an ammonia converter which would required one-half or less the time required to fabricate the usual converter, and which would be easier to ship than the usual large, heavy-walled converter.

It is an object of the present invention to provide an ammonia converter of an all-welded design, eliminating expensive high-pressure flanged closures. If such closures were to be eliminated on large diameter thick-walled vessels, cutting and re-welding to change catalyst or to make repairs would be a major undertaking requiring considerable down time. The converter of the present invention, is so constructed as to make such cutting and re-welding feasible, with the resultant elimination of flanged closures and the change of leakage at such closures.

It is an object of the present invention to provide an ammonia converter of a simplified and improved design, including a simplified method of joining the catalyst section to the heat exchanger section.

It is an object of the present invention to provide an ammonia converter characterized by the maximum use of the converter cross-section for heat exchanger tubes.

It is an object of the present invention to provide an ammonia converter characterized by a small catalyst volume relative to the outer shell mass, and the use of catalyst cooling gas to blanket the catalyst bed. This design enables the catalyst bed to be properly cooled, and eliminates the necessity of insulation around the catalyst bed while insuring that the outer shell of the converter will be sufficiently protected against high temperature.

These and other objects of the invention which will be described hereinafter, or which will be apparent to one skilled in the art upon reading this specification, are accomplished by that structure and arrangement of parts of which contain exemplary embodiments will now be described. Reference is made to the drawings wherein.

Figure 2:
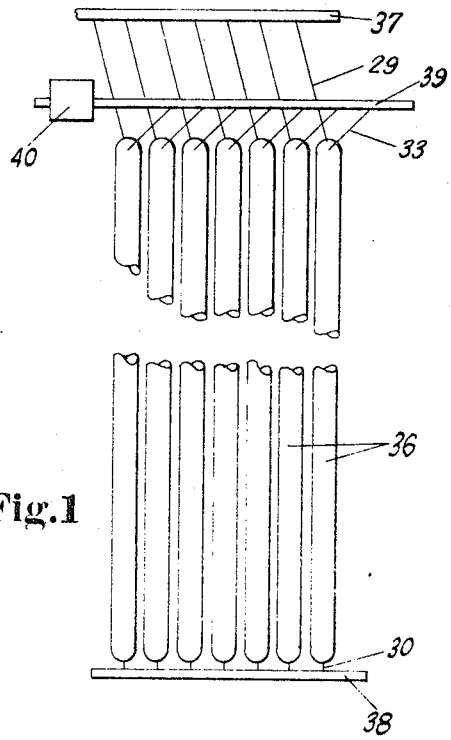
FIGURE 2 is an elevational cross-section of the converter of the present invention.
Figure 2:
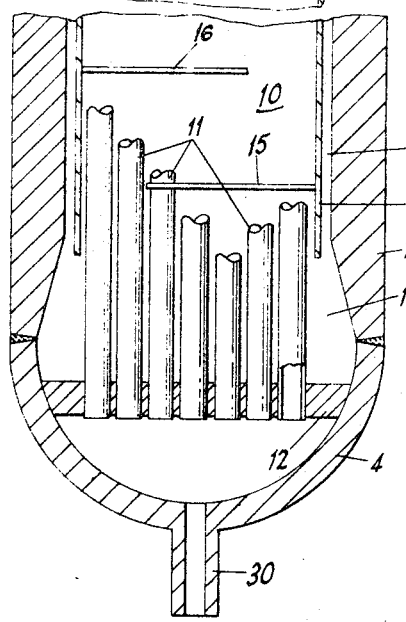

The converter of the present invention is best shown in FIGURE 2. The converter comprises a shell 1 of reduced thickness at its ends as at 2. The ends of the shell are closed by hemispherical heads 3 and 4, which may be pressed from metal plate. Since the heads are hemispherical in configuration, their thickness need only be approximately half the thickness of the cylindrical outer shell. Within the outer shell, the ammonia converter is provided with an inner shell 5 having an outside diameter slightly less than the inside diameter of the outer shell 1. This difference in diameter provides an annular passage 6 between the outside surface of the inner shell 5 and the inside surface of the outer shell 1. The location of the inner shell, to insure that the passage 6 is uniform in width thereabout, may be provided with guide means 7. The inner shell 5 may be welded or otherwise affixed to the head 3 as at 8, and provided with insulative material 9 at its upper end.

The lower portion of the inner shell 5 comprises a heat exchange section generally indicated at 10. The heat exchange section comprises a chamber formed by the inner shell and provided with a plurality of heat exchanger tubes 11. The tubes 11 are supported at the bottom of the converter by a tube sheet 12. The upper ends of the tubes 11 are supported by a second tube sheet 13. It will be noted that the inner shell 5 does not extend down to the tube sheet 12, so that an annular entrance to the heat exchange section is formed between the tube sheet 12 and the lower end of the inner shell 5, and is generally indicated at 14. Within that portion of the shell 5, constituting the heat exchanger section, a plurality of baffles are located, two of which are indicated at 15 and 16. These baffles are horizontally oriented, and permanently affixed to the tubes 11, or supported by rods from tube sheet 12. The baffles are provided with a plurality of perforations through which the heat exchanger tubes 11 extend.

A catalyst basket 17 is located within the upper portion of the inner shell 5. The lower portion of the catalyst basket is permanently affixed to a catalyst support 18, which, in turn, is permanently affixed to the upper tube sheet 13. The catalyst support 18 may be provided with a catalyst screen 19 to prevent catalyst from passing therethrough. The upper end of the catalyst basket 17 may also be provided with a catalyst retaining screen 20, to hold the catalyst in place during shipment and installation of the ammonia converter. It will be noted that the catalyst basket 17 has an outside diameter slightly less than the inside diameter of the shell 5 whereby an annular gas passage 21 is formed therebetween. Catalyst basket guides 22 may be employed to insure proper spacing of the catalyst basket.

Figure 3:
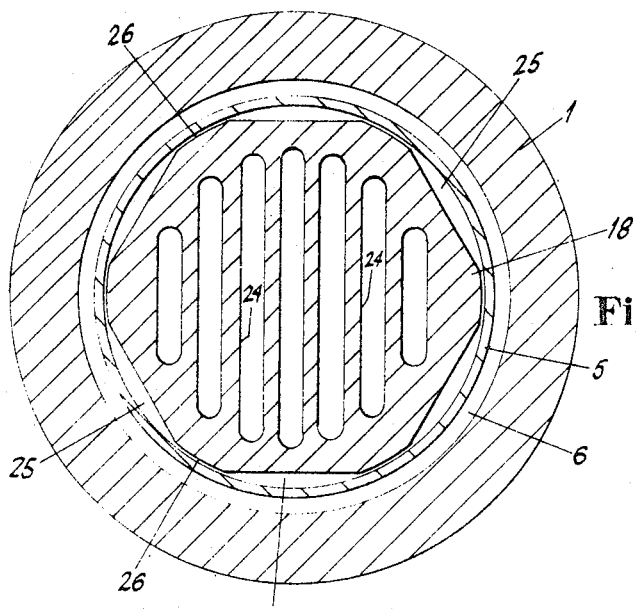
FIGURE 3 is a cross-sectional view of the converter taken along the section line 3—3 of FIGURE 2.
Figure 4:
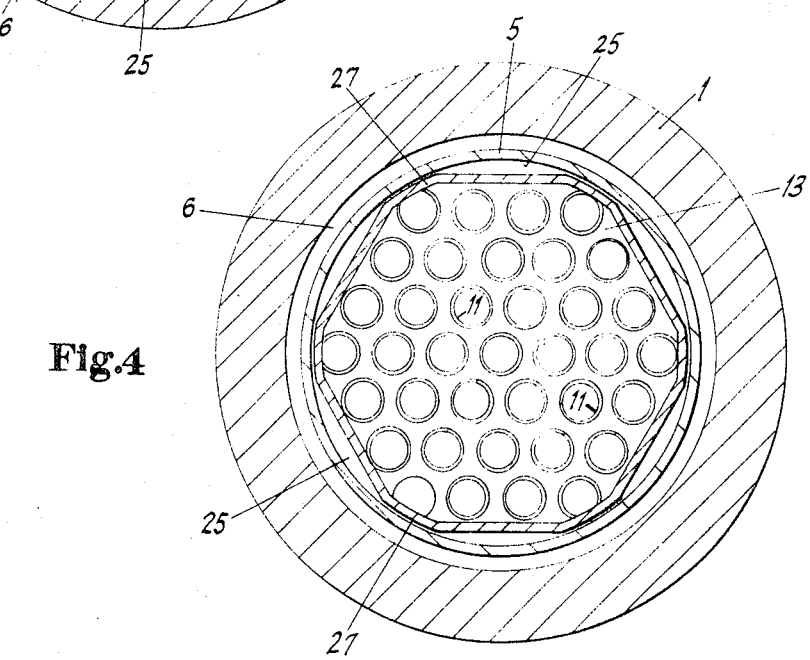
FIGURE 4 is a cross-sectional view of the converter taken along the section line 4—4 of FIGURE 2.

FIGURES 3 and 4 illustrate the construction of the upper tube sheet 13 and the catalyst support 18. As stated above, these two elements are adapted to be affixed together as by welding or the like (as at 23 in FIG. 2). The combination of these two elements eliminates the complex baffle system generally used between the heat exchanger section and the catalyst basket of an ammonia converter. Referring first to FIGURE 3, it will be noted that the catalyst support is substantially hexagonal in configuration, and provided with a plurality of transverse slots 24 constituting gas passages from the catalyst basket. The substantially hexagonal configuration of the catalyst support 18 provides gas passages 25 between the catalyst support and the inner shell 5. The catalyst support is also provided with guide surfaces 26 which may bear against the inner surface of the shell 5.

FIGURE 4 illustrates the construction of the upper tube sheet. It will be noted that the upper tube sheet 13 is of the same substantially hexagonal configuration as the catalyst support 18, providing for the gas passages 25 between the upper tube sheet and the inner shell 5. Similarly, the upper tube sheet is provided with guide surfaces 27 which may bear against the inner surface of the shell 5. The tube sheet 13 is provided with a plurality of perforations within which the upper ends of the heat exchanger tubes 11 are retained in gas-tight fashion.

Referring to FIGURE 2, it will be noted that the catalyst support 18 is provided with a downwardly extending flange 18a, the lower end of which is welded to the upper surface of the tube sheet 13 as at 23. Thus, a chamber 28 is formed between the catalyst support 18 and the tube sheet 13, which are held in spaced relationship by the flange 18a.

The ammonia converter of the present invention is provided with a synthesis gas inlet 29 in the head 3. A product gas outlet 30 is provided in the head 4. A start-up heating element 31 may also be provided in the head 3. The heating element will extend through the head, the insulation 9 and into the chamber 32 formed by the inner shell 5, the catalyst retaining screen 20 and the insulation 9.

A cold gas inlet, or by-pass inlet 33 extends through the head 3 and insulation 9, into the chamber 32. Finally, the ammonia converter may be provided with additional elements, as for example a temperature indicator generally shown at 34. There may be a perforated plate 20a underlying the screen 20 at the top of the catalyst basket.

Briefly, in the operation of the ammonia converter of the present invention, synthesis gas is introduced into the converter via the inlet 29. The synthesis gas flows downwardly through the annular passage 6 to the bottom of the converter and serves as a means for cooling the outer shell 1. At the bottom of the converter, the synthesis gas passes into the heat exchanger section 10 through the annular opening 14. The synthesis gas is caused to flow upwardly through the heat exchanger section, around the baffles 15 and 16 and the heat exchanger tubes 11. At the top of the heat exchanger section, the gas passes through the passages 25 formed between the inner shell 5 and the peripheral surfaces of the upper tube sheet 13 and the catalyst support 18. The synthesis gas continues its upward flow in the annular passage 21 to the chamber 32. At this point, the synthesis gas enters the catalyst bed through the catalyst screen 20 and/or plate 20a and the exothermic reaction described above takes place. The product gases pass out of the catalyst basket through the catalyst retaining screen 19 and the longitudinal slots 24 in the catalyst support 18, and into the chamber 28. From the chamber 28, the product gas enters the heat exchanger tubes 11 and flows downwardly therethrough to the converter outlet 30.

When the converter is started up, the incoming synthesis gas may be brought to reaction temperature by the start-up heater 31. During the operation of the converter, the reaction temperature of the synthesis gas will be obtained by heat exchange of the upwardly flowing synthesis gas with the downwardly flowing product gas in the heat exchanger tubes 11. There will also be heat exchange between the upwardly flowing synthesis gas and the catalyst basket while the synthesis gas is flowing upwardly through the annular passage 21. This heat exchange will also serve to maintain the proper temperature within the catalyst bed.

As an additional means of retaining the proper temperature within the catalyst bed, additional synthesis gas may be introduced through the cold gas or by-pass inlet 33. Synthesis gas so introduced will by-pass the heat exchanger section of the ammonia converter.

Figure 5:
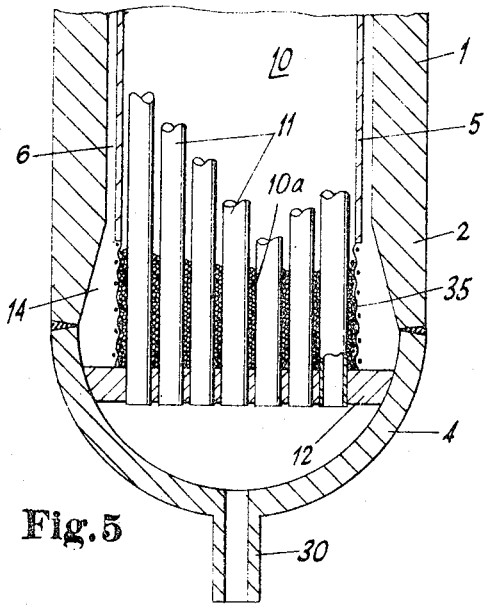
FIGURE 5 is a partial elevational view, in cross-section, illustrating another form of heat exchanger for the converter of the present invention.

FIGURE 5 illustrates an alternate construction for the heat exchanger section of the ammonia converter of the present invention. Like parts have been given like index numerals. In this embodiment, the baffles such as those illustrated at 15 and 16 in FIGURE 2 are eliminated, and the heat exchanger section is packed with an inert material (generally indicated at 10a) of approximately the same size as the catalyst used in the catalyst basket. A screen 35, to retain the inert material, is placed about the annular opening 14 between the end of the inner shell 5 and the tube sheet 12. In this embodiment, the use of the inert material insures the proper heat exchange between the upwardly flowing synthesis gas and the heat exchanger tubes 11, and eliminates the necessity and expense of providing baffles within the heat exchanger section.

Figure 1:
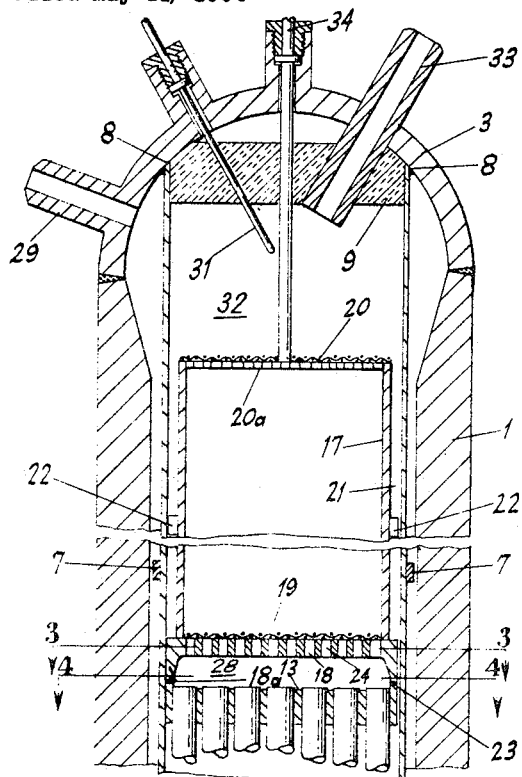
FIGURE 1 is a diagrammatic representation of a plurality of the ammonia converters of the present invention connected in parallel.

As indicated above, a plurality of ammonia converters of the present invention may be connected in parallel to provide a product gas output of substantially any capacity desired. FIGURE 1 illustrates a plurality of ammonia converters 36 so connected. The synthesis gas inlets 29 are connected to an inlet header 37. The converter outlets 30 are connected to an outlet header 38. The cold gas or by-pass inlets 33 are connected to a by-pass header 39. In this way an installation may be made of any desired production capacity, or the capacity of an installation may be increased simply by adding more converters of the type described.

Ammonia converters of the type described may be more easily and less expensively fabricated. Similarly, the fabrication may be more quickly accomplished. Converters of the type described may be more easily handled and shipped. It will further be understood by one skilled in the art, that the ammonia converter of the present invention may be incorporated not only in a vertical position but also in an inclined or horizontal position. The use of hemispherical heads allows for a reduced thickness of the outer shell at the heads. This in turn permits an all-welded design for the pressure vessel. Expensive and sometimes troublesome flanged closures are eliminated since cutting and rewelding of the thin-walled portion of the converter to change catalyst or make repairs is easily accomplished with a considerable reduction of down time.

The use of the converters of this invention connected in parallel as shown in FIGURE 1, is greatly facilitated by the fact that while long, they may be made with a relatively small diameter. Dimensions do not constitute a limitation on the invention; but in an exemplary construction the converters may be, say, thirty feet in length between heads while having an outside diameter of no more than about eight inches. In such a converter the heat exchange section may be about ten feet in length, and the catalyst basket about twenty feet in length.

Modifications may be made in the ammonia converter of the present invention without departing from the spirit of it. For example, when the converters of the present invention are connected in parallel as in FIGURE 1, the individual start-up heaters 31 for each converter may be eliminated. The individual start-up heaters may be replaced by a single start-up heater located in the bypass header 39, serving a bank of ammonia converters. Such a heater is diagrammatically represented at 40 in FIGURE 1.

The invention having been described in certain exemplary embodiments, what is claimed as new and desired to be secured by Letters Patent is:

1. A converter comprising:
   (1) a cylindrical casing having top and bottom ends,
   (2) closure means at the top and bottom of the casing,
   (3) an interior cylindrical sleeve joined to the top closure means and extending downwardly within the said casing to a point near the bottom end thereof,
   (4) a lower tube plate jointed to the lower closure means and perforated for the reception of heat exchange tubes,
   (5) an upper tube plate located intermediate the ends of said sleeve and perforated for the reception of heat exchange tubes,
   (6) heat exchange tubes extending between the said tube plates and forming a heat exchange section,
   (7) a perforated catalyst support plate mounted above said upper tube plate and spaced therefrom, and joined to said upper tube plate by means of a flange whereby to form a chamber between said upper tube plate and said perforated catalyst support plate,
   (8) a cylindrical catalyst basket above said catalyst support plate, spaced inwardly from said sleeve, the top of said catalyst basket being spaced from the upper closure means, there being passageways for gas between said upper tube plate, said catalyst support plate and said flange respectively and the interior surface of said sleeve,
   (9) an inlet means through said upper closure means connecting with a space in said casing outside said sleeve, and
   (10) an outlet means in said lower closure means connecting with the space below said lower tube plate, whereby process gases introduced through said inlet means can pass downwardly externally of said sleeve and thence upwardly within said sleeve and around said heat exchange tubes, past said upper tube plate, said catalyst support plate and said catalyst basket to a space above the top of said catalyst basket, and thence downwardly through said catalyst basket, said catalyst support plate and said heat exchange tubes to the said outlet.

2. The structure claimed in claim 1 wherein said top and bottom closure means are in the form of hemispherical members of lesser thickness than the thickness of said casing and are welded thereto.

3. The structure claimed in claim 1 wherein said top and bottom closure means are in the form of hemispherical members of lesser thickness than the thickness of said casing and are welded thereto, upper and lower portions of said casing being tapered to reduce the thickness of the said portions to substantially the same thickness as the upper and lower closure means.

4. The structure claimed in claim 3 including baffles within said heat exchange section for bringing the gases traveling upwardly therethrough into more intimate contact with said heat exchange tubes.

5. The structure claimed in claim 3 including a packing of inert granular material within said sleeve and surrounding said heat exchange tubes and a cylindrical screen member lying between the lower end of said sleeve and the said lower tube plate and acting to retain said granular material in position.

6. The structure claimed in claim 3 wherein the top of the catalyst basket is spaced from the top closure means so as to provide a chamber, and including supplementary inlet means extending through the top closure means into said chamber for the introduction of process gases for temperature control purposes.

7. The structure claimed in claim 6 including a perforated closure plate at the top of said catalyst basket and wherein the perforated catalyst support plate and the perforated closure plate at the top of the catalyst basket are each provided wih a wire screening to assist in the retention of granular catalyst in the said catalyst basket.

8. The structure claimed in claim 6 including a heating means extending through said upper closure means and into the last mentioned chamber.

9. The structure claimed in claim 8 including insulating means located in said top closure means at the end of said sleeve, and including also temperature measuring means extending through said top closure means and said insulative means.

10. A structure comprising a plurality of the converters of claim 6 in assembled relationship, the outlet means of said converters, the inlet means thereof and the said supplementary inlet means being connected respectively to separate headers.

11. The structure claimed in claim 10 wherein the header connected to the said supplementary inlet means incorporates a chamber having heating means therein.

References Cited

UNITED STATES PATENTS

| | | | |
|---|---|---|---|
| 1,927,286 | 9/1933 | Jaeger et al. | 23—288 |
| 1,960,386 | 5/1934 | Lopez | 23—289 |
| 2,356,700 | 8/1944 | Rupp et al. | 23—288.9 |
| 2,861,873 | 11/1958 | Worn | 23—289 |
| 2,887,365 | 5/1959 | De Rycker et al. | 23—289 X |
| 3,050,377 | 8/1962 | Christensen | 23—289 |
| 3,235,344 | 2/1966 | Dreyer et al. | 23—289 |
| 3,270,906 | 9/1966 | Christensen | 23—289 X |

FOREIGN PATENTS 1,274,228 9/1961 France.

JOSEPH SCOVRONEK, Primary Examiner